United States Patent [19]
Chesavage

[11] Patent Number: 5,834,925
[45] Date of Patent: Nov. 10, 1998

[54] CURRENT SHARING POWER SUPPLIES WITH REDUNDANT OPERATION

[75] Inventor: Jay A. Chesavage, Palo Alto, Calif.

[73] Assignee: Cisco Technology, Inc., San Jose, Calif.

[21] Appl. No.: 853,156

[22] Filed: May 8, 1997

[51] Int. Cl.[6] .................................................. H02M 7/00
[52] U.S. Cl. ............................................ 323/272; 307/58
[58] Field of Search .................................. 363/65, 69, 70, 363/71; 323/268, 272; 307/58, 82, 59

[56] References Cited

U.S. PATENT DOCUMENTS

| | | | |
|---|---|---|---|
| 4,035,715 | 7/1977 | Wyman et al. . | |
| 4,257,090 | 3/1981 | Kroger et al. | 363/65 |
| 4,618,779 | 10/1986 | Wiscombe | 307/60 |
| 4,628,433 | 12/1986 | Notohamiprodjo | 363/65 |
| 4,734,844 | 3/1988 | Rhoads | 363/72 |
| 4,766,364 | 8/1988 | Biamonte et al. . | |
| 4,860,188 | 8/1989 | Bailey | 363/65 |
| 4,866,295 | 9/1989 | Leventis et al. | 307/43 |
| 4,924,170 | 5/1990 | Henze | 323/272 |
| 5,036,452 | 7/1991 | Loftus | 363/71 |
| 5,122,726 | 6/1992 | Elliot et al. | 323/272 |
| 5,319,536 | 6/1994 | Malik | 363/65 |
| 5,477,132 | 12/1995 | Canter et al. | 323/282 |
| 5,521,809 | 5/1996 | Ashley et al. | 363/71 |
| 5,552,643 | 9/1996 | Morgan et al. | 307/81 |

*Primary Examiner*—Shawn Riley
*Attorney, Agent, or Firm*—Jay Chesavage

[57] ABSTRACT

A plurality of power supplies are connected in parallel, each power supply isolated from the others using a non-linear isolation element such as a barrier diode. Feedback is furnished around the non-linear isolation element such that the voltage drop of the isolation element is reduced to be within the regulation range desired. The non-linear characteristic of the isolation element combined with feedback produces an output impedance which is low for high currents, and exponentially higher for low output currents for current sharing versus output offset voltage improvement.

12 Claims, 5 Drawing Sheets

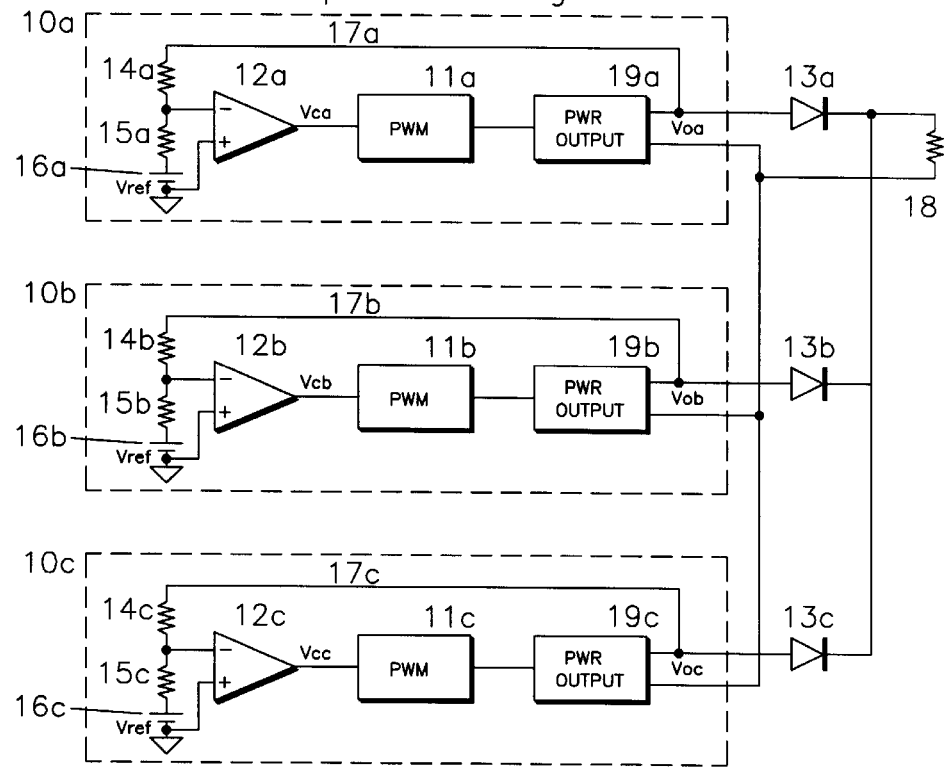
Figure 1: Prior Art – Output Summing Diodes
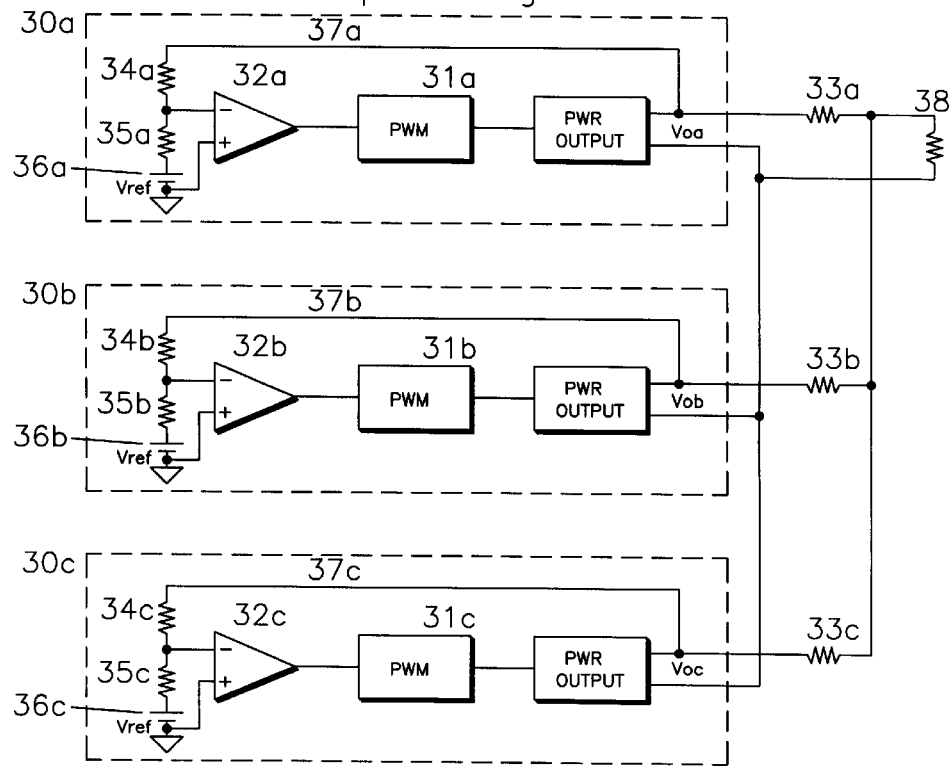
Figure 2: Prior Art – Droop Sharing

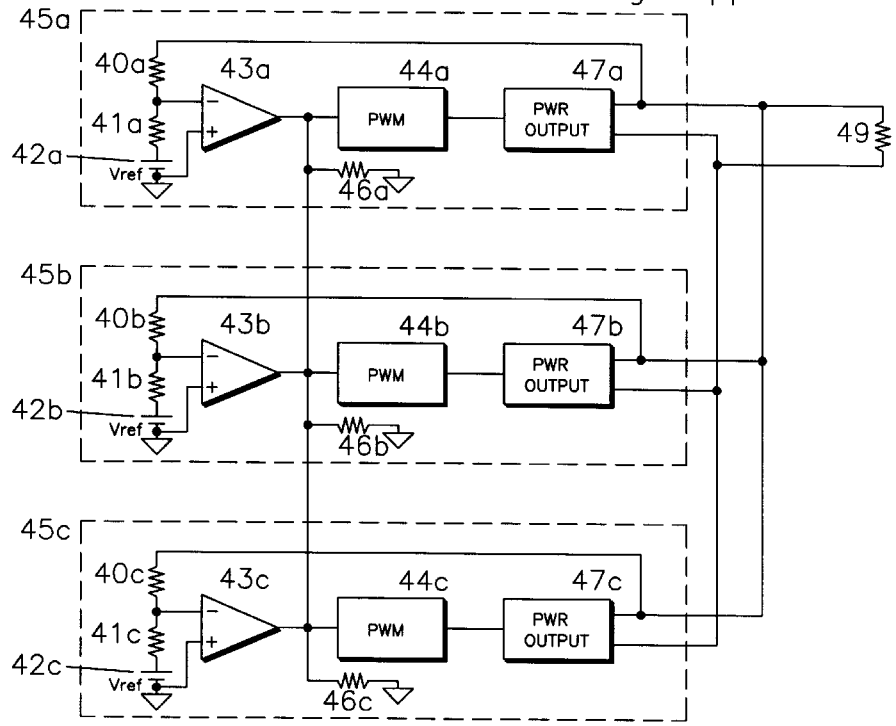
Figure 3: Prior Art – 3 wire current sharing supplies
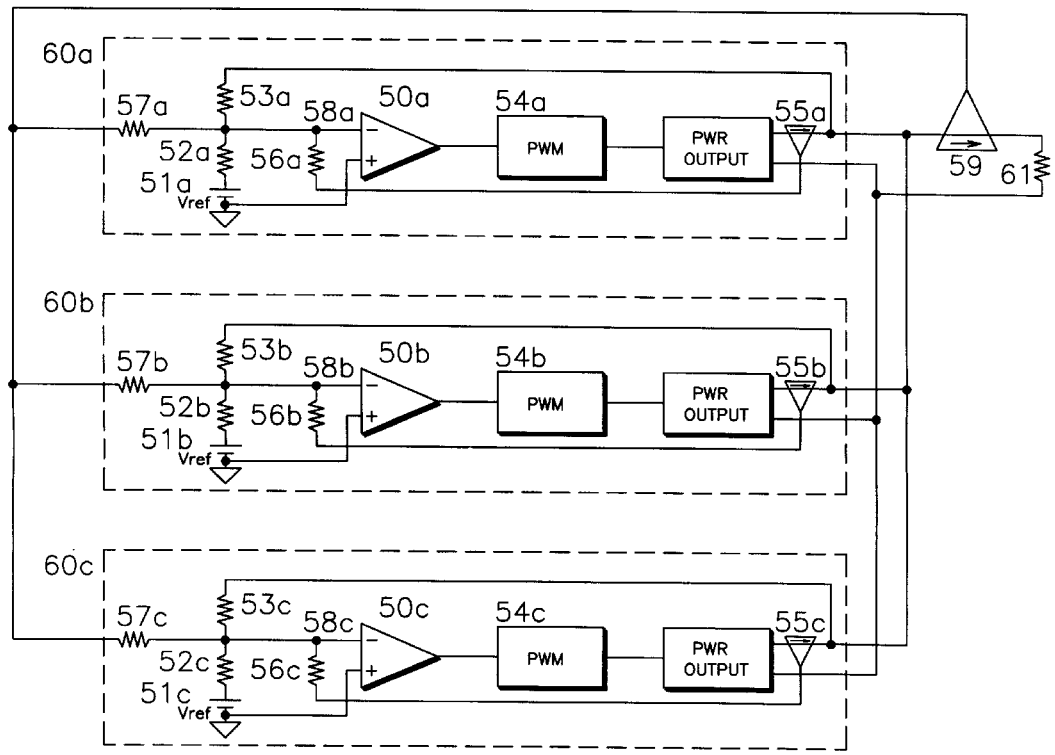
Figure 4: Prior Art – Local Current Sense

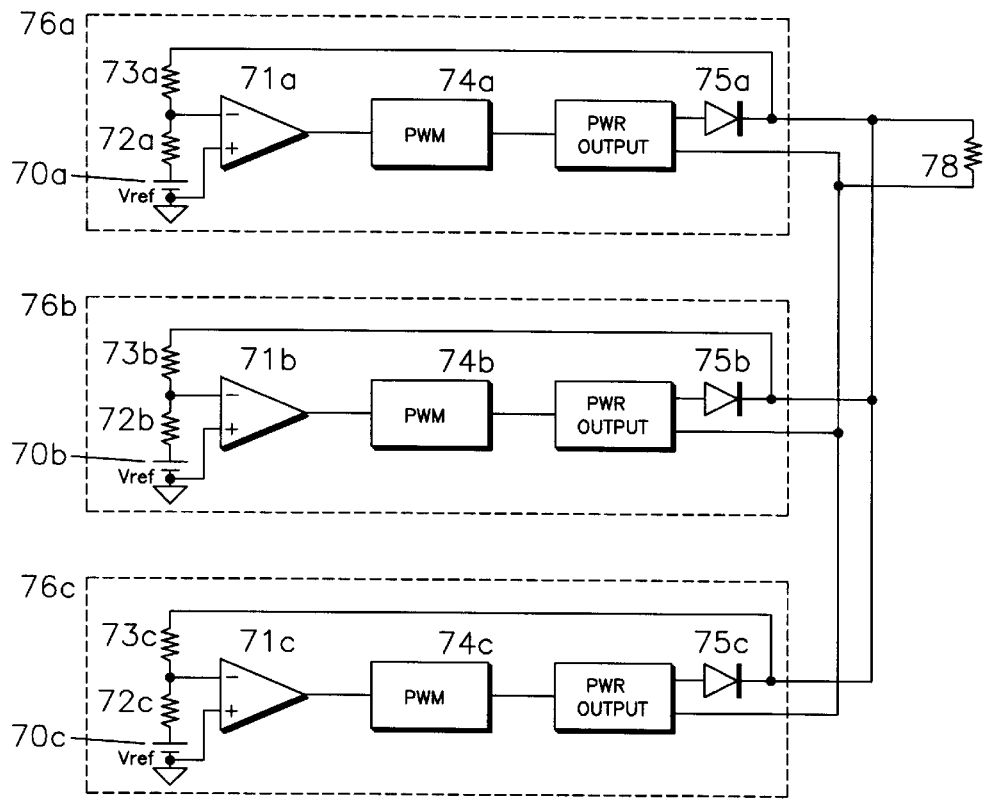
Figure 5
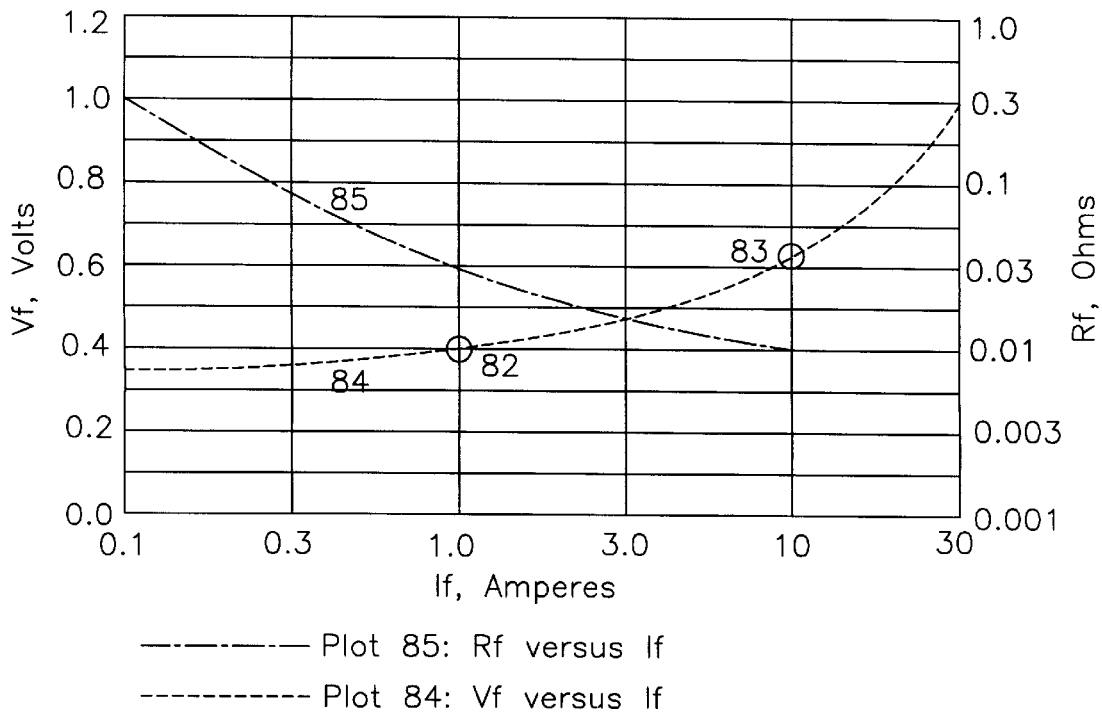
Figure 6: Typical Diode Characteristic
—·—·— Plot 85: Rf versus If
---------- Plot 84: Vf versus If Figure 7: Output characteristics of Fig. 2 and Fig. 5
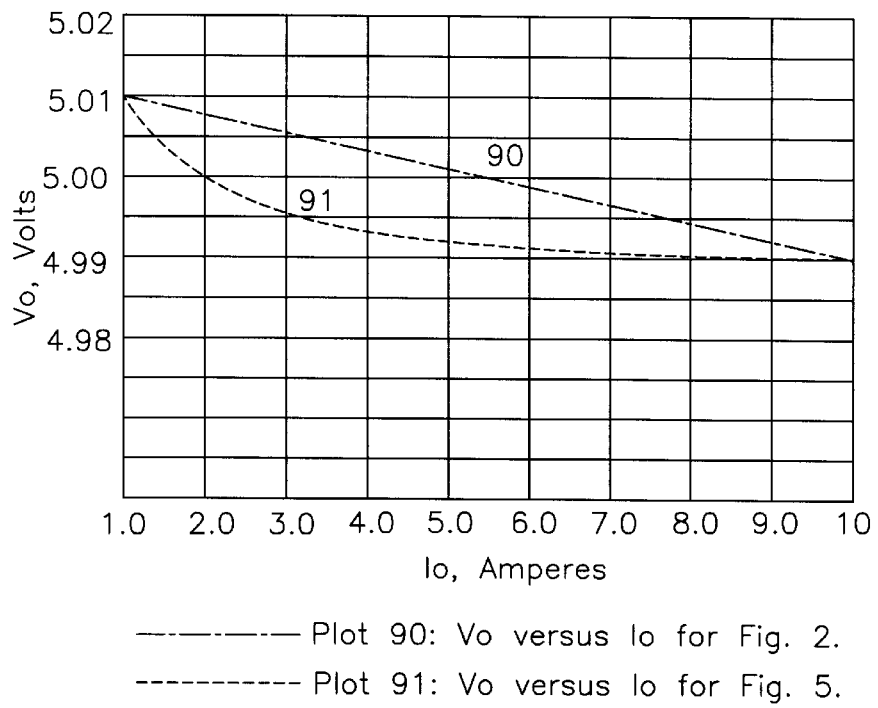
————— Plot 90: Vo versus Io for Fig. 2.
----------- Plot 91: Vo versus Io for Fig. 5.
Figure 8: Current Sharing of Fig. 2 and Fig. 5
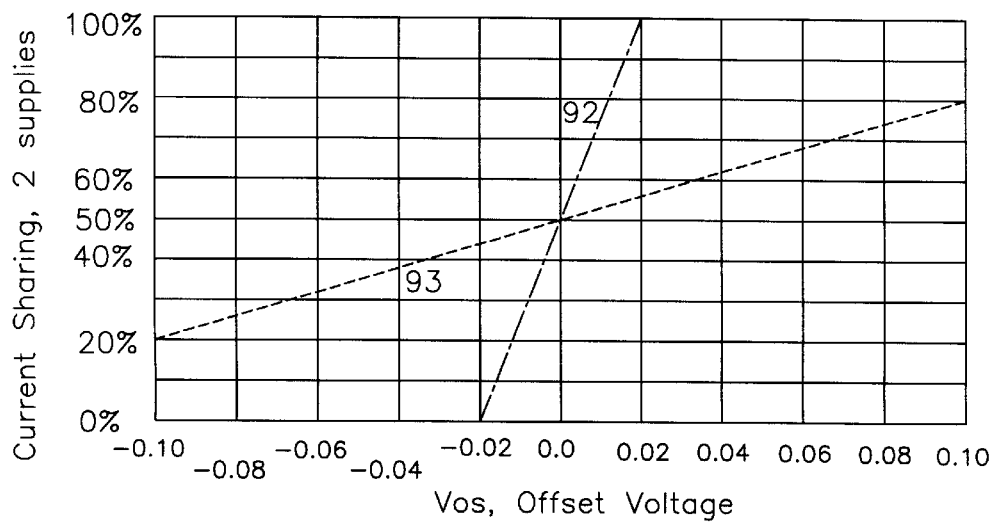
————— Plot 92: Current sharing of Fig. 2.
----------- Plot 93: Current sharing of Fig. 5.

CURRENT SHARING POWER SUPPLIES WITH REDUNDANT OPERATION

FIELD OF THE INVENTION

This invention is directed to the class of redundant mode power supplies found in applications requiring very high reliability such as networking equipment, wherein the loss of one or more power supplies, or the mains power to one or more of such supplies should not cause any disturbance in the operation of the equipment receiving power.

BACKGROUND OF THE INVENTION

Redundant power supplies are used in networking equipment to increase the overall reliability of the associated network equipment. This improvement in reliability is available through several mechanisms. The first mechanism of importance for increased reliability during steady state, long term operation is lower output current operating point, which results in lower operating temperatures and currents within the power supply. The second mechanism, which is important in the event of power supply shutdown, mains power failure, or power supply failure is linear operation, which is generally guaranteed by current sharing. As long as all of the supplies present are current sharing, the transient response of the power supply to this class of disturbances is essentially governed by the same conditions which afford well behaved load regulation characteristics. For example, the load regulation of the power supply is typically very well behaved, and for linearly operating power supplies, the failure of one such supply appears to the remaining supplies as an incremental step change in output current. By contrast, when power supplies are not current sharing and the power supply delivering the bulk of the current fails, the power supply that was formerly idling turns on with non-linear characteristics similar to initial power-up, causing the cessation of delivery of output power during this turn-on interval, during which the equipment receiving power goes through an interval of partial to complete loss of power.

The prior art in the area of redundant current sharing power supplies falls into three general areas: droop sharing power supplies, 3 wire control power supplies, and local sensing power supplies. The first area pertains to droop sharing power supplies, as in U.S. Pat. No. 4,924,170 (Henze) wherein the output impedance of the supply is used to share load current. Disclosed in this patent is local feedback of output current as a term which has the overall effect of increasing the output impedance of the supply for DC, while maintaining a low output impedance at higher frequencies.

The second area is 3 wire control power supplies, wherein the output of a high gain error amplifier is fed commonly to low gain output stages to produce an common output, which requires sharing of internal signals in addition to the usual combined outputs. One example of this is U.S. Pat. No. 4,734,844 (Rhoads et al) which describes a 3 wire regulation system wherein a master supply generates a control output, and a plurality of slave units act on this common control signal. This system has the weakness that if one of the supplies contaminates the common control signal with erroneous input, the entire system will replicate and produce an erroneous output. Rhoads does not address redundancy in the sense of immunity to component failure, but shows additional interconnections between supplies for them to work properly. U.S. Pat. No. 5,521,809 (Ashley et al) discloses a current sharing circuit based on the power supplies exchanging information with each other relating to the level of current sharing through a separate bus wire, identified in the patent as a sharebus. Each power supply has a local estimate of current being delivered, which is compared with a fraction of the total current, and a local feedback term is provided to each supply to achieve current sharing. This method affords a high degree of accuracy in current sharing, but does not address either on-line redundancy or transient behavior. U.S. Pat. No. 5,122,726 (Elliott et al) discloses overvoltage protection for redundant power supplies, and discloses diode coupling as a means for achieving on-line isolation between power supplies, and makes reference to the difficulty of achieving current sharing or load regulation under this topology. Also disclosed is current sharing in a master/slave relationship, using a control signal common to all supplies. The inventive elements of this patent are directed to an overvoltage circuit which is able to monitor overall output voltage, and selectively disable the defective power supply producing the overvoltage condition.

A related method combining aspects of the first and third class of sharing is shown in U.S. Pat. No. 4,618,779 (Wiscombe) which describes a scheme for regulating a plurality of power supplies by modulating the value of the sense resistor in the feedback loop via an external controller which modulates this value based on sensing current delivered by each supply to the load.

The third area is local sensing power supplies, in which a locally sensed version of the output signal is compared with the total output current, and the local error signal represents a combination of output error signal and current sharing error. U.S. Pat. No. 4,035,715 (Wyman et al) describes a current sharing system wherein the total system output current is made available to each supply so as to ensure that each supply does not furnish more than its proportion of total load current. U.S. Pat. No. 5,552,643 (Morgan et al) describes a method of current summing wherein multiple switch mode power supplies deliver current to a common inductor. This addresses a method of current summing, but does not afford redundant operation. U.S. Pat. No. 4,257,090 (Kroger et al) describes a current sharing system wherein feedback is provided to each power supply based on the sum of the output voltage and a local measurement of inductor current, which ensures that each power supply is operating below the maximum current as constrained by a saturated output inductor. U.S. Pat. No. 5,477,132 (Canter et al) is similar to Ashley, and discloses means for measuring a total current, and delivering this measurement to the individual power supplies, which compare this total value to their individual contribution, and produce a local error term which is summed into the regulation loop along with the global (output) voltage regulation term. U.S. Pat. No. 4,866,295 (Leventis et al) describes another technique for current sharing based on measurement of output current from each supply being subtracted from a total measured output, similar to that described by Canter and Ashley. U.S. Pat. No. 4,766,364 (Biamonte et al) discloses a redundant power supply having a common output filter and distributed diode and inductor energy storage circuits. In this master/slave configuration, the master power supply computes an error signal that is distributed to the slave units. Each power supply further has decision circuitry to take that unit off-line if there appears to be a failure in that unit. A master error causes each slave supply to furnish its own local error signal and ignore the master signal.

SUMMARY OF THE INVENTION

The present invention allows power supplies to be connected in a parallel configuration, wherein the combination of power supplies share current without additional circuit complexity or overhead as compared to individual supplies and therefore affords more reliable operation. In general, the improvement in current sharing over output voltage offset between power supplies with parallel-connected outputs is roughly 10 times better than the droop sharing configuration, and has no increased circuit complexity when compared to competing schemes such as 3-wire control, or local control, which require substantially more components, many of which interfere with the premise of independent operation of units implicit in the reliability calculations. Therefore, a first object of the invention is a power supply which shares current over a wide range of output currents. A second object of the invention is a power supply which shares current while maintaining a high tolerance to output voltage offsets and drifts, particularly at low output currents. A third object of the invention is a highly reliable current sharing power supply.

BRIEF DESCRIPTION OF THE DRAWINGS

FIG. 1 shows a prior art power supply having output summing diodes.

FIG. 2 is a prior art system belonging to the class of current sharing power supplies hereafter referred to as droop current sharing power supplies.

FIG. 3 is a prior art system belonging to the class of current sharing power supplies hereafter referred to as 3 wire control current sharing power supplies.

FIG. 4 is a prior art system belonging to the class of current sharing power supplies known as local current sensing current sharing power supplies.

FIG. 5 shows the present invention incorporating the features of diode current summing and output voltage feedback.

FIG. 6 shows the output and dynamic resistance characteristics of a silicon schottky diode.

FIG. 7 shows the output characteristic of the power supply of FIG. 2 and FIG. 5.

FIG. 8 shows the current sharing characteristics of the power supplies of FIGS. 2 and 5.

SUMMARY OF THE INVENTION

Figure 9:
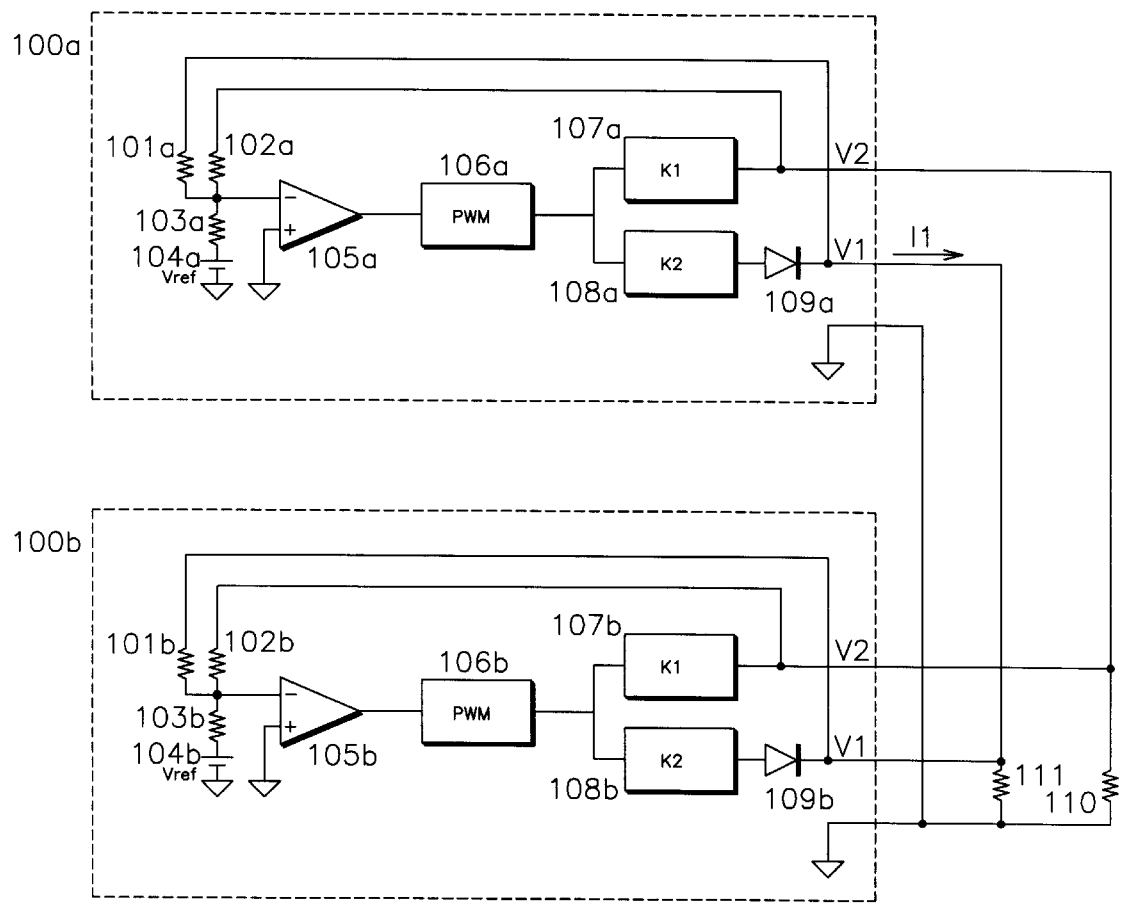
FIG. 9 shows a cross-regulating dual-output power supply.

Current sharing power supplies have the characteristic of sharing output current over a range of output current. Redundant mode power supplies have the characteristic of continuously providing output voltage within tightly specified voltage limits throughout the life of the equipment utilizing the provided power, including throughout failure events in the power supplies. This disclosure is directed at the class of power supplies responsible for both redundant and current sharing operations. In modern networked computer systems, for example, it has become critical to have both power supply functions of redundancy and current sharing. There are several topologies found for redundant mode power supplies. In one topology, the primary mains power to each supply is furnished from a different source to ensure continuous operation even if a mains power source should fail. The default topology is the case where a power supply furnishing some fraction of the load fails and goes off-line. Regardless of topology, it is preferred to have a plurality of power supplies operating with each supply sourcing a fraction of the current such that the difference in current from supply to supply is less than roughly 25% of the nominal current obligation of that supply. While exactly dividing the current between supplies may seem desirable, in practice negligible incremental system benefit is derived. Much more significantly, when a pair of power supplies are not current sharing, and the power supply affording the majority of the current fails, the idling power supply must instantaneously change from none to full current. Generally, the transient output characteristic of a power supply has two modes: The first mode is characterized by a fairly fast transient response time associated with linear operation at one operating point moving to a new linear point of operation. An example of such linear operation is changing the load point from 10% or 50% of rated load to 100% of rated load. Such load point adjustments can be made in a matter of milliseconds, or faster, and are purely the consequence of the feedback control system compensating the power supply. During this load point shift, the power supply output voltage remains in regulation, and varies typically less than 2% of nominal output voltage. The second mode of dynamic operation is a supply moving from a point of idling, or furnishing no output current to supplying full current. In this case, the feedback loop is in a saturated off state, and must slew the control signal to a full on condition, followed by regulation to a stable operating point. Frequently, such supplies also have an error output slew limiting circuit to prevent overvoltage at the output of the supply during the power-up condition. The result is that the saturation recovery time of the power supply is much longer than the dynamic response time of the power supply. The simplest way to ensure that the fastest response time, and therefore the best dynamic regulation in the event of a power supply failing, is to guarantee that the supplies current share during proper operation. It should be clear to one skilled in the art that the dynamic response time remains short even if the power supply is operating at 10% of total load current. Since for redundant operation, the power supply must be rated to carry the full load if all the other supplies are turned off, current sharing is generally not done for the purpose of reducing the stress level seen by the supply during redundant operation, although the stress level of the supply is nevertheless reduced by redundant operation, and power supplies operated in this configuration generally operate longer without failure than those operating at a higher load point.

FIG. 1 shows a plurality of non-current sharing power supplies connected together via summing diodes. In this configuration, each of power supplies 10a–c (and associated sub-elements suffixed a–c in the figures) comprise a pulse width modulator 11 driving an output stage 19, which provides output voltage to isolation diode 13, which delivers power to load 18. Feedback resistors 14 and 15, and stable reference source 16 provide an error input to the error amplifier 12 such that the output voltage 17, shown as Vo is stable. For a typical high gain operational amplifier 12, the equation of operation would be:

$$Vc = 10^6 (V_+ - V_{31})$$

and the DC operation of the entire circuit becomes:

$$Vo = V_{16}(R_{14}/R_{15}),$$

where $R_{14}$ and $R_{15}$ are the values of elements 14 and 15 respectively, $V_{16}$ is the value of the stable reference source 16, and the output delivered to the load 18 is $Vo - V(D_{13})$ where $V(D_{13})$ is the voltage drop of diode element 13.

Diode 13 has intrinsic voltage drops as will be seen in FIG. 6 which make load regulation difficult. The variation in load current will cause a variation in output voltage, creating what is generally described as insufficient load regulation. Examining for example moving between 1A point 82 and 10A point 83 of output current, it can be seen that the diode voltage changes from 0.4 V to 0.6 V, or 200 mV over this range. Because this voltage drop is outside the feedback regulation loop, the entirety of this voltage drop is seen by the load 18. It can be seen that although the diode offers needed isolation between power supplies, it functions at the expense of output load regulation.

General reliability of systems fall into two classes: series systems and parallel systems. Given a series system comprising two elements with failure rates respectively of $\lambda 1$ and $\lambda 2$ the respective reliabilities $R_1$ and $R_2$ may be may be computed as $$R_1 = \exp(-\lambda_1 t), \text{ and}$$

$$R_2 = \exp(-\lambda_2 t)$$

where R1 and R2 are the system reliabilities associated with failure rates $\lambda_1$ and $\lambda_2$.

The total reliability rate for the series system RT=R1*R2. MTBF, or Mean Time Before Failure, is defined as $1/\lambda$.

For the case where the failure rate for a power supply is known to be $\lambda_1 = 10/10^6$ hours, the reliability over $10^6$ hours is Rsupply=exp (−10)=4.54×10$^{-5}$, while for the diode the failure rate $\lambda 2 = 0.1/10^6$ hours and the related reliability over $10^6$ hours is Rdiode=exp (−0.1)=0.905

In the case where two such components are placed in series, the reliability decreases to Rdiode+supply=(4.54×10$^{-5}$) (0.905)=4.11×10$^{-5}$, corresponding to a failure rate of 10.1 every $10^6$ hours, and we can see that the incremental decrease in reliability (from 10 to 10.1 in $10^6$) by adding a comparatively reliable diode is small. The related MTBF values are as follows:

$$MTBF_{supply} = 100,000 \text{ hours}$$

$$MTBF_{diode+supply} = 99,010 \text{ hours}$$

For 2-unit redundant systems the MTBF is found to be $3/2\lambda$, while for 3-way redundant systems, the MTBF is found to be $11/6\lambda$. For repairable systems reporting power supply failure status, it is rarely necessary to use more than 3 power supplies in such a configuration.

If we were to use two such diode+supply combinations and put them in parallel, we would find MTBF(2×diode+supply)=(3/2)99,010=148,515 hours. This improvement increases dramatically when system reporting of power supply failures is taken into account, and the failed power supply is replaced before a final power supply failure occurs.

FIG. 2 shows a droop sharing configuration. Power supplies 30 have outputs connected together via droop sharing resistance 33. The other elements error amplifier 32, pulse width modulator 31, feedback resistors 34 and 35, and voltage reference 36 maintain the same functions as described earlier. The purpose of this droop sharing resistance 33 is to balance the current sharing between power supplies. The value of 33 is typically set to cause less than 0.5% output regulation drop. For example, in a 5 V, 10 A power supply, the droop resistance 33 would be 0.005Ω, which would produce a 50 mV output drop at full load. The droop sharing configuration is an improvement over the diode sharing configuration of FIG. 1, in terms of improved output voltage regulation (in this example, 50 mv versus 200 mv of FIG. 1) however, a new operating constraint is present. In order for each power supply to be guaranteed of delivering current to the load, rather than idling, the offset between power supplies must be $$|Voa-Vob| < Imin \, Rd,$$

or, conversely the minimum load related to achievable offsets would be $$Imin > |Vo_a - Vo_b| / Rd, \text{ where}$$

$Vo_a$ and $Vo_b$ are each the respective differences between output voltage from each supply. For example, if one power supply furnished 5.005 v and the other furnished 4.995 v, $|Vo_a - Vo_b| = 0.010$ v.

Rd is the droop resistance of each power supply= 0.005Ω for our example

Imin is the minimum load current drawn under operating conditions

For the case where $|Vo1-Vo2|=10$ mV, a typical value for modern supplies, and Rd=0.005Ω, the minimum current would be 1 A, which means that for a load of 1 A, one of the supplies would be furnishing all of the output current, and the other would be marginally operating. Load currents above 1 A would share for the excess of the current above 1 A, so for example a 2 A load would cause one supply to deliver 0.5 A, and the other to deliver 1.5 A. The alternative to achieving lower minimum load current would be to increase Rd to a larger value at the expense of load regulation, or use power supplies with tighter voltage offsets, trade-offs which have traditionally caused difficulties in droop sharing power supplies. The principal advantage of droop sharing power supplies is simplicity, as each supply is operating separately and summing its output.

FIG. 3 discloses the 3 wire method of current sharing. In this scheme, previously described elements voltage reference 42, high gain amplifier 43, pulse width regulator 44, and voltage divider 40 and 41 operate as shown in FIG. 1. High gain amplifier 43 is of the transconductance type operating into a load resistor 46, such that the modified equation of operation for elements 43 and 46 are $$Vc = R46 * (10^6/R46) * (V+ - V-), \text{ where}$$

the expression $(10^6/R46)$ is the transconductance gain, and is scaled by R46 in this example to produce the same gain as was produced earlier in FIG. 1, such that adding more amplifiers and gain setting resistors 46 does not modify the gain of the resultant circuit. The purpose of choosing a transconductance type amplifier is to enable a summed output connection, wherein the various error amplifier signals are summed together to produce a common error signal 48. This error signal is then fed to the low-gain pulse width amplifiers 44 and output stage 47, which due to low gain would tend to current share to within 20% of nominal current. While this represents a great advantage in terms of current sharing over droop sharing, it has problematic reliability elements. For example, the control signal 48 is shared over all supplies, and should some sort of failure occur in this signal, no isolation would occur, and this disturbance would propagate through all supplies, and to the load 49. As can be seen, the failure tolerance of this configuration is compromised, and attempts to address this simply add more elements and complexity.

FIG. 4 is the prior art scheme referred to now as local current sensing. Again, previously described elements error amplifier 50, voltage divider 53 and 52, reference voltage source 51 maintain their previously described functions. New elements local current sense amplifier 55, local current summing resistor 56, total current amplifier 59, and total current summing resistor 57. Typically, resistors 56 and 57 provide balancing currents to node 58 such that when the amplifier is providing a proper share of total current, these currents balance, and when the amplifier is providing less or more than the expected current, an additional error signal is provided to encourage respectively greater or lesser output voltage to compensate. As can be seen, many new elements have appeared, and while the interests of current sharing may be served, those of reliable redundancy are not. Single points of failure can be identified, such as the total current sensor 59, and in the event of total loss of a single power supply, while the remaining power supplies will current share, the output voltage will statically drop, as the current sharing balance of node 43 will indicate that each power supply is sourcing more than its expected contribution of output current.

FIG. 5 shows the new configuration for a scalable, current sharing redundant mode power supply operating over a wide range of total load currents. Previously disclosed elements voltage reference 70, error amplifier 71, voltage divider 72 and 73, pulse width modulator 74, and summing diode 75 are operating in the new topology wherein the feedback point is taken after the summing diode. In prior art power supplies, and as shown previously, the gain of element 71 is chosen to be quite high, a result which produces very good output load and line regulation. Consequentially, this selection of high feedback loop gain also produces a very low output impedance, such that the resultant power supply could be used in the droop sharing circuit of FIG. 1 with the addition of a droop sharing resistor 31 outside the feedback loop as shown in FIG. 2. As will be seen, the characteristics of the error amplifier 71 will be chosen such that summing diode 75 produces a low output resistance at high current for good load voltage regulation, and the diode characteristic combined with feedback will produce a desired higher output impedance at lower currents for improved current sharing over a very wide range of load currents.

FIG. 6 shows a diode characteristic curve 84 for output current versus voltage for a typical schottky barrier diode, such as Motorola device MBR1035. While curve 84 is an actual diode curve, the general form of this curve is of the well known formula $I = I_o e^{(V/Vt)}$, where Io is the leakage current of the diode, often measured in the reverse bias condition, V is the applied diode voltage Vt is 0.026 V at room temperature, as derived from the familiar formula $Vt = kT/q$, where k is Boltzmann's constant, T is the temperature in Kelvin, and q is the electron charge constant.

The dynamic resistance of this curve is numerically evaluated for various currents and is shown logarithmically as curve 85, which can be seen to vary from 10 m$\Omega$ to 300 m$\Omega$ at diode currents of 10 A to 1 A respectively. As can be seen, the diode resistance curve 85 shows a drop in resistance with increased applied current. This is desired for achieving good load regulation at high currents in our power supply 76, however, if this diode is used in the circuit of FIG. 1 at currents varying from 1 to 10 amperes, the output voltage drop in moving from point 83 to point 82 would be an intolerable 250 mV.

If we solve the equations of operation for the circuit of FIG. 5, we develop the following relationships:

$$Vo = -K_{74}A_{71}V_m + Z_{75}I_o$$

$$V_m = V_o(R_{72}/(R_{72}+R_{73})) + V_{70}(R_{73}/(R_{72}+R_{73})), \text{ where}$$

$R_{72}$, $R_{73}$, $R_{74}$ are the resistance of the named elements 72 through 74, $Z_{75}$ is the combined resistance of the PWM output stage and summing diode 75, $A_{71}$ is the gain of the error amplifier $K_{74}$ is the gain of the pwm output stage Vo, Vm, Io are the voltages and currents shown in FIG. 5, and solving these for the dynamic output resistance $\Delta Vo/\Delta Io$, we determine $$Zo = \Delta Vo/\Delta Io = Z_{75}/\{1+(K_{74}A_{71}R_{72})/(R_{72}+R_{73})\}.$$

for simplicity, we will use $A_{fzr} = \{1+(K_{74}A_{71}R_{72})/(R_{72}+R_{73})\}$ to denote feedback impedance reduction.

The physical interpretation of this output resistance from FIG. 5 shows that the output resistance $Z_{75}$ is reduced by the loop gain $\{1+(K_{74}A_{71}R_{72})/(R_{72}+R_{73})\}$. Ordinarily, the objective of such an exercise would be to drive the loop gain to a very high value to ensure high voltage stability. We will instead select a gain based on the characteristic of summing diode 75 to produce a desired level of current sharing. Returning again to FIG. 6, we can see that the dynamic resistance of the diode, as shown as a function of output current by curve 84, varies from 10 m$\Omega$ to 300 m$\Omega$ at diode currents of 10 A to 1 A. From the formula above for Zo, it is now possible to choose gain elements which allow the selection of the output impedance of the power supply at a particular operating current. Furthermore, if this impedance is chosen at the maximum output current to satisfy the desired current sharing level, the same scaling factor present in equation for $A_{fzr}$ will scale the curve 83 of FIG. 6 to produce better current sharing tolerance of output offset between supplies at lower operating currents. For example, if we use the earlier computed values:

Rd=0.005$\Omega$,

Imax=10 A, then the value from FIG. 6 would be 30 m$\Omega$.

We would then select values for the feedback reduction factor would be 0.001=0.030/$A_{fzr}$, and we would compute $A_{fzr}$=30.

It should be clear to one skilled in the art that while a diode characteristic is shown for a device with impedance decreasing with increasing current, many such other semiconductor and resistive devices having such a characteristic are available, including fast-acting resistors having a negative resistance temperature coefficient, although the diode is believed to be superior because it is part of the circuit affording redundancy and load isolation. It is also clear that many values of $A_{fzr}$ could be used which advantageously provides an output resistance profile scaled to particular system requirements.

FIG. 7 shows the output droop characteristics, where curve 90 shows the output characteristics for the standard droop supply of FIG. 2 with the above values, and curve 91 represents the characteristic of FIG. 5 for the case where the overall diode drop is scaled to be the same as the droop resistance.

FIG. 8 shows the current sharing results for the power supply with this characteristic. Curve 92 shows the current sharing versus offset voltage between supplies for the droop configuration of FIG. 1, while curve 93 shows the improved current sharing achieved with the diode-feedback configuration of FIG. 5. As is clear from FIG. 8, the diode circuit of FIG. 5 results in an order of magnitude improvement in current sharing, with negligible degradation in load regulation.

As should be clear to one skilled in the art, the basic elements of a PWM, error amplifier, power output stage, voltage reference, and voltage divider could be modified individually or collectively to achieve scaling of the diode characteristic to produce the desired non-linear output resistance characteristic so as to encourage current sharing at low currents between supplies, but the best mode for such an arrangement is shown for illustrative purposes. As an example of such a rearrangement, FIG. 9 shows a cross regulated power supply wherein the reduction in gain is the result of feedback of two different output voltages. In this case, the gain of the error amplifier could be taken to be very high, and the gain reduction comes about from the cross regulation of the two output voltages. Inclusion of the summing diode in this feedback circuit has the same effect as the earlier illustration wherein the error amplifier was shown with limited gain. Examining in detail the operation of the parallel power supplies 100, there is shown reference voltage 104, error amplifier 105, pulse width modulator 106, and dual output stages 107 and 108, each having gains respectively of K2 and K1, and load resistors 111 and 110. Solving the equations for a single power supply circuit 100a or 100b operating into load resistors 110 and 111, we can derive the following:

$$V_1 = \{V_{ref} Rp/R_{103}\}/\{\{Rp\{1/R_{101}+K_2/K_1R_{102}\}-1/K_1Av\}$$

$$Z_1 = V_1/I_1 = \{K_2R_{109}Rp/K_1R_{102}-R_{109}/AvK_1\}/\{Rp/R_{101}+RpK_2/K_1R_{102}-1/AvK_1\}$$

where $V_{ref}$ is the reference voltage of source 104, Rp is the parallel resistance of elements 101, 102, and 103, $R_{101}$, $R_{102}$ and $R_{103}$ are the resistances respectively of elements 101, 102, and 103, K1 and K2 are the gain constants of output sections 108 and 107 respectively, Av is the gain of error amplifier 105, $R_{109}$ is the dynamic resistance of diode 109. From the equation for output resistance, we can evaluate for equal values of R101, R102, and R103 and a very large value for Av, as is typical for error amplifiers operating at maximum DC gain, and derive the following expression for output resistance: $V1/I1=Z1=R_{109}\{K_2/\{K_1+K_2\}\}$. As can be seen from this expression, the diode resistance R109 is scaled by $\{K_2/\{K_1+K_2\}\}$, while Av was allowed to become very large. As should be clear to one skilled in the art, many different forms of diode scaling are available to accomplish current sharing through increased dynamic resistance at low currents compared to higher currents, as illustrated in this example. The operation of parallel supplies 100a and 100b is identical to the operation outlined in FIGS. 6, 7, and 8 with regard to current sharing characteristics.

I claim:

1. A redundant mode power supply comprising:
   a power stage having an error signal as input and producing as output a voltage proportional to said error signal;
   a variable resistance element connected between said power stage output and a power supply output, said variable resistance element having a lower resistance for high currents passing through said variable resistance element and a higher resistance for a minimum current passing through said variable resistance element;
   an error amplifier producing said error signal in proportion to a gain constant multiplied by the difference between a reference voltage and said power supply output voltage, said error amplifier having a gain constant with a value of $$A_{fer} \leq I_{min} R_d/|Voa-Vout|$$

where
   $A_{fer}$ is said error amplifier gain constant,
   $R_d$ is a resistance of said variable resistance element resistance at a maximum output current,
   $|Voa-Vout|$ is a absolute value of a difference between said power stare output voltage and said power supply output at said minimum load current,
   $I_{min}$ is said minimum load current.

2. The power supply of claim 1 wherein said variable resistance element is a semiconductor device.

3. The power supply of claim 2 wherein said semiconductor device is a diode.

4. The power supply of claim 1 wherein said variable resistance element is a material having a negative temperature coefficient.

5. A plurality 2 to n of redundant mode power supplies connected in a parallel configuration and having a common power supply output, each power supply j comprising:
   a power stage having an error signal as input and producing as output a voltage proportional to said error signal;
   a variable resistance element connected between said power stage output and said power supply output, said variable resistance element having a lower resistance for high currents passing through said variable resistance element and a higher resistance for low currents passing through said variable resistance element;
   an error amplifier producing said error signal in proportion to a gain constant multiplied by the difference between a reference voltage and said power supply output voltage, said gain constant having a value of $$A_{fer} \leq Imin\ Rd/|Vo(j)-Vo|$$

where
   $A_{fer}$ is said error amplifier gain constant,
   $R_d$ is a resistance of said variable resistance element resistance at a maximum output current,
   $|Vo(j)-Vo(mean)|$ is an absolute value of a difference between said power stage output voltage of said power supply j and a power supply output voltage at said minimum load current, and
   $I_{min}$ is said minimum load current.

6. The power supply of claim 5 wherein said variable resistance element is a semiconductor device.

7. The power supply of claim 6 wherein said semiconductor device is a diode.

8. The power supply of claim 5 wherein said variable resistance element is a material having a negative temperature coefficient.

9. A redundant mode power supply having a single output voltage and comprising:
   a plurality n of power stages having an error signal as input and producing as output a voltage proportional to said error signal, each of said power stages having a gain $P_i$ where n is larger than two, and i is an index having a value from 2 to n;
   a plurality n of variable resistance elements connected between each of said power stage output and said single output voltage, said variable resistance elements having a lower resistance for high currents passing through said variable resistance element and a higher resistance for low currents passing through said variable resistance element;

a plurality n of error amplifiers each having a reference voltage, said error amplifiers producing n said error signals in proportion to a gain constant $K_i$ multiplied by a difference between said reference voltage and said power supply output voltages, each of said error amplifiers individually providing said error signal to each of said power stages;

said output stage gain constants $P_i$ and said error amplifier gain constant $K_i$ are chosen such that $$Zo_i \leq P_i K_i |Vo_i - Vout|/Imin$$

where $Zo_i$ is an output impedance of each of n said power stages operating at a minimum power stage output current added to a resistance of each of i said variable resistance elements operating at a minimum power stage output current, $|Vo_i - Vout|$ is an absolute value of a difference between said power stage n output voltage and said output voltage at said minimum power stage output current, and Imin is a minimum load current, equal to a sum of each of n said minimum power stage output currents.

10. The power supply of claim 9 wherein said variable resistance element is a semiconductor device.

11. The power supply of claim 10 wherein said semiconductor device is a diode.

12. The power supply of claim 9 wherein said variable resistance element is a material having a negative temperature coefficient.

* * * * *